United States Patent [19]

Ishigaki

[11] Patent Number: 4,860,377
[45] Date of Patent: Aug. 22, 1989

[54] HAND SCANNER INPUT SYSTEM AND A SHEET USED IN HAND SCANNER INPUT SYSTEM

[75] Inventor: Toshinori Ishigaki, Tokyo, Japan

[73] Assignee: Kabushiki Kaisha Toshiba, Kawasaki, Japan

[21] Appl. No.: 201,264

[22] Filed: Jun. 2, 1988

Related U.S. Application Data

[63] Continuation of Ser. No. 792,571, Oct. 29, 1985, abandoned.

[30] Foreign Application Priority Data

Oct. 30, 1984 [JP] Japan .................... 59-228510

[51] Int. Cl.$^4$ ............................................. G06K 9/00
[52] U.S. Cl. .......................... 382/59; 235/470; 235/472; 250/566; 250/568; 358/443; 358/494; 382/61
[58] Field of Search ............ 382/9, 59, 61, 65, 67; 358/280, 282, 293, 294; 250/566, 568; 235/470, 472, 482, 483

[56] References Cited

U.S. PATENT DOCUMENTS

| 3,238,501 | 3/1966 | Mak et al. .................... 235/472 |
| 3,471,684 | 10/1969 | Berezov ....................... 250/566 |
| 3,596,060 | 7/1971 | Tibbals et al. ................ 235/470 |
| 4,009,467 | 2/1977 | Kodera et al. ................. 382/61 |
| 4,136,332 | 1/1979 | Kadota et al. .................. 382/9 |
| 4,216,378 | 8/1980 | Monette ....................... 250/201 |
| 4,219,736 | 8/1980 | Thibodeau ..................... 382/67 |
| 4,260,979 | 4/1981 | Smith ......................... 382/59 |
| 4,300,123 | 11/1981 | McMillin et al. ............... 382/61 |
| 4,553,035 | 11/1985 | Malinsky et al. ............... 235/472 |
| 4,582,768 | 4/1986 | Takeuchi et al. ............ 101/Dig. 12 |
| 4,633,507 | 12/1986 | Cannistra et al. .............. 382/61 |
| 4,641,357 | 2/1987 | Satoh ......................... 382/61 |
| 4,661,699 | 4/1987 | Welmers et al. ............... 358/293 |
| 4,684,998 | 8/1987 | Tanioka et al. ................ 358/293 |
| 4,695,722 | 9/1987 | Motooka ...................... 358/293 |

FOREIGN PATENT DOCUMENTS 2098348A 11/1982 United Kingdom.

OTHER PUBLICATIONS

Japanese Patent Abstract, vol. 6, No. 67, Apr. 28, 1982, JP-A-57 7674 to Hozumi.

*Primary Examiner*—Leo H. Boudreau
*Attorney, Agent, or Firm*—Finnegan, Henderson, Farabow, Garrett, & Dunner

[57] ABSTRACT

A hand scanner input system has a hand scanner. The scanner scans a medium having an image or images such as characters or graphic patterns. A mark is printed on this medium or on a transparent sheet to be placed on the medium. Hence, the mark is read when the scanner scans the medium. The image and mark read by the scanner are input to a data processor having a microcomputer. The microcomputer eliminates overlapping of the pieces of image data read by the scanner and the displacement of the scanning start position in accordance with the data representing the mark.

10 Claims, 8 Drawing Sheets

F I G. 4
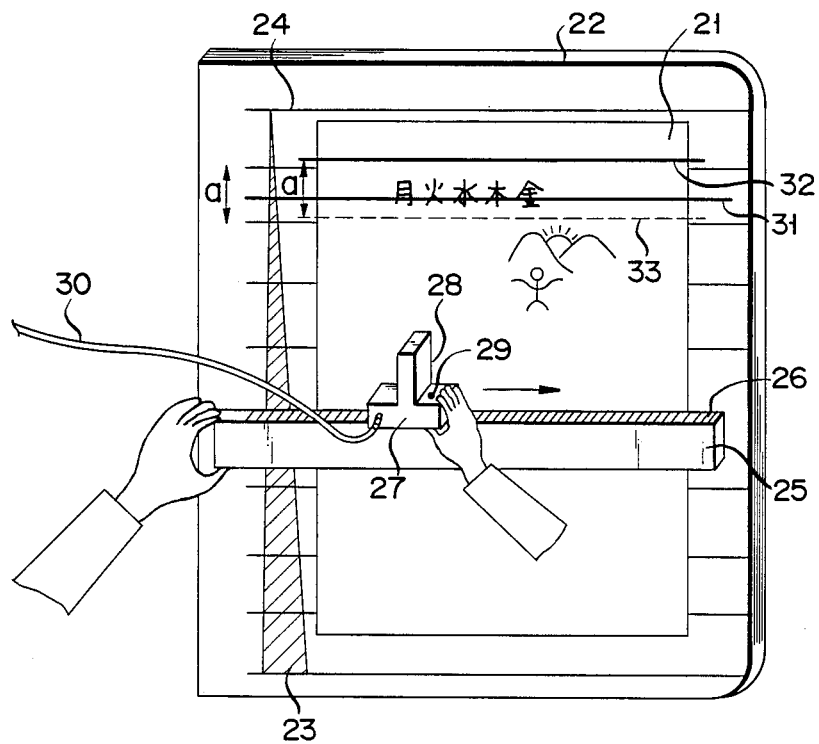

HAND SCANNER INPUT SYSTEM AND A SHEET USED IN HAND SCANNER INPUT SYSTEM

This application is a continuation of application Ser. No. 792,571, filed Oct. 29, 1985, now abandoned.

BACKGROUND OF THE INVENTION

The present invention relates to a hand scanner input system which reads image data from a recording medium and inputs the data into a storage means.

With reference to FIG. 1, it will be explained how a conventional hand scanner reads image data from a document and inputs the data to a data processor. A document sheet 8 is fixed on a rectangular tablet 2. Tablet 2 has holes 10 arranged at equal intervals along its left side. A rail 1 is attached to the left side of tablet 2. The left end of a ruler 3 is butted on rail 1, and has one through hole.

The operator slides ruler 3, against the rail to align it with the lowest line of sheet 8, and secures ruler 3 with respect to tablet 2 by inserting a stopper 9 into one of holes 10 through the hole of ruler 3. The operator then slides a hand scanner 4 on the edge of ruler 3 to the left until the scanner contacts rail 1. The operator then turns the switch 6 of scanner 4 on and manually moves scanner 4 to the right (in the direction of the arrow) along ruler 3. While being moved in this way, hand scanner 4 scans sheet 8 and simultaneously detects strobe-generating slits 11 which are cut in the edge of ruler 3; thus generating image data signals and strobe pulses. The signals and pulses are supplied from hand scanner 4 to the data processor (not shown) through signal line 7. When scanner 4 reaches the right side of sheet 8, the one-row area scanning ends. The operator pulls stopper 9 out and slides ruler 3 upward along rail 1, bringing ruler 1 into alignment with the next scanning line of sheet 8.

The operator repeats the sequence of operations stated in the preceding paragraph to scan all of the row areas of sheet 8 and input all obtained image data to the data processor (not shown).

The conventional hand scanner needs the assistance of rail 1 and ruler 3 to scan document sheet 8. Further, tablet 2 must have hole 10 to align ruler 3 with every row area to be scanned. The whole system, including rail 1, tablet 2 and ruler 3, as well as hand scanner 4, is complicated and expensive. Moreover, to bring ruler 3 into alignment with every row area and fasten it to tablet 2 is cumbersome and time consuming.

The intervals at which holes 10 are arranged are equal to the width of the scanning surface of hand scanner 4. Hence, when these intervals are different from the pitch at which characters are printed on document sheet 8, hand scanner 4 reads the lower half of each character of one line 12 of sheet 8 in the nth row area-scanning, and reads the upper half of each character of line 12 in the (n+1)th row area scanning. Even if the intervals are equal to the character pitch, the same problem will occur when document sheet 8 is placed on tablet 2 such that the character lines are not horizontally aligned with holes 10. Consequently, the characters reproduced from the data read and input by hand scanner 4 are distorted as shown in FIG. 3. When ruler 3 is horizontally displaced after the nth row-area scanning and before the (n+1)th scanning, the characters reproduced from the data input by scanner 4 are distorted as shown in FIG. 2. Such distorted characters are hard to read and understand.

SUMMARY OF THE INVENTION

It is an object of this invention to provide a hand scanner input system which is simple in structure, is easy to operate and can input image data of high quality to a data processor.

According to the present invention, there is provided a hand scanner input system comprising a hand scanner for scanning a medium to input image data to a data processor, a medium with a regular mark printed on it, and a ruler for guiding the hand scanner. The medium is either a document sheet having an image such as characters or graphic patterns, or a tablet on which such a document sheet is placed. The regular mark is read for every slice-scanning of the sheet. Any overlapping input data caused by the hand scanner at every slice-scanning can be corrected to a high degree of precision, by the data obtained by reading the mark at the slice-scanning, thus preventing double input and ultimately achieving high-quality image data input. A deviation of the start position for every slice-scanning, if any, can be automatically corrected by the data the scanner has output by reading the mark at the slice-scanning. Therefore, the system requires no rail for determining the scan start position of the scanner. Nor does it need a stopper or a tablet having holes. The system has a simple overall structure and yet can perform high-quality data input.

BRIEF DESCRIPTION OF THE DRAWINGS

Other objects and features of the present invention will be apparent from the following description, taken in connection with the accompanying drawings in which:

FIGS. 2 and 3 are examples of the image input by the device of FIG. 1;

FIG. 4 is a perspective view of the overall configuration of a hand scanner input system according to one embodiment of the present invention;

Detailed Description of the Preferred Embodiments

Figure 1:
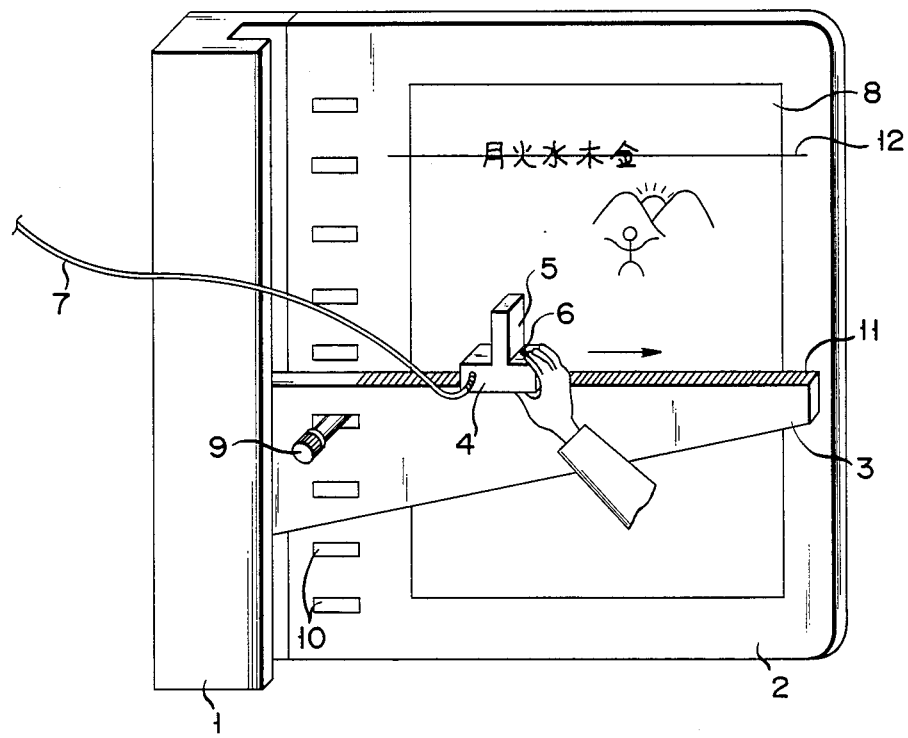
FIG. 1 is a perspective view of a conventional hand scanner device.

As shown in FIG. 4, a document sheet 21 having an image (e.g., characters and/or graphic patterns) is set on a rectangular tablet 22. A black mark 23 is printed on tablet 22 along the left side thereof. Mark 23 is tapered, gradually narrowing toward the top of tablet 22. Horizontal, parallel guide lines 24 are also printed on tablet 22 at the intervals equal to the read width of the sensor built within hand scanner 27. A ruler 25 is used to guide hand scanner 27. Strobe-generating slits 26 are cut in one side of ruler 25. Hand scanner 27 has a switch 29. A line 30 is used to supply power source voltage to scanner 27 and to supply image data, strobe pulses and a switch signal from scanner 27 to a data processor (not shown).

Figure 5:
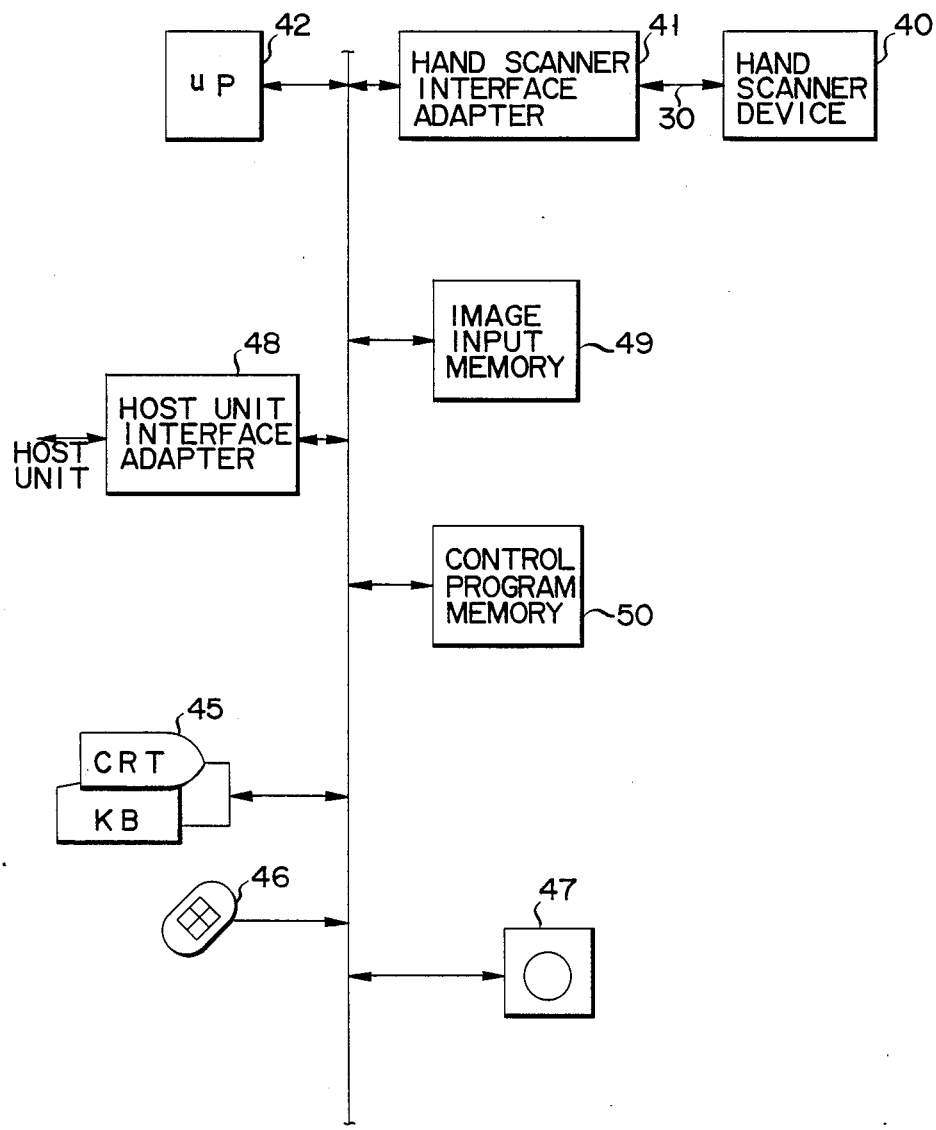
FIG. 5 is a block diagram of the hand scanner controller used in the system of FIG. 4.

The hand scanner device shown in FIG. 4 is controlled by the controller shown in FIG. 5. This controller is provided in a host system. Hand scanner device 40 is coupled to a hand scanner interface adapter logic 41 by a signal line 30. The input/output operation of interface adapter logic 41 is controlled by a micro-computer 42. Microcomputer 42 also controls a display keyboard unit 45, an external memory device 47 such as a floppy disk drive 47, and the input/output operation of a host unit interface adapter 48. The data supplied from hand scanner device 40 is stored in an image input memory 49. A program for controlling microcomputer 42 is stored in a control program memory 50.

Figure 6:
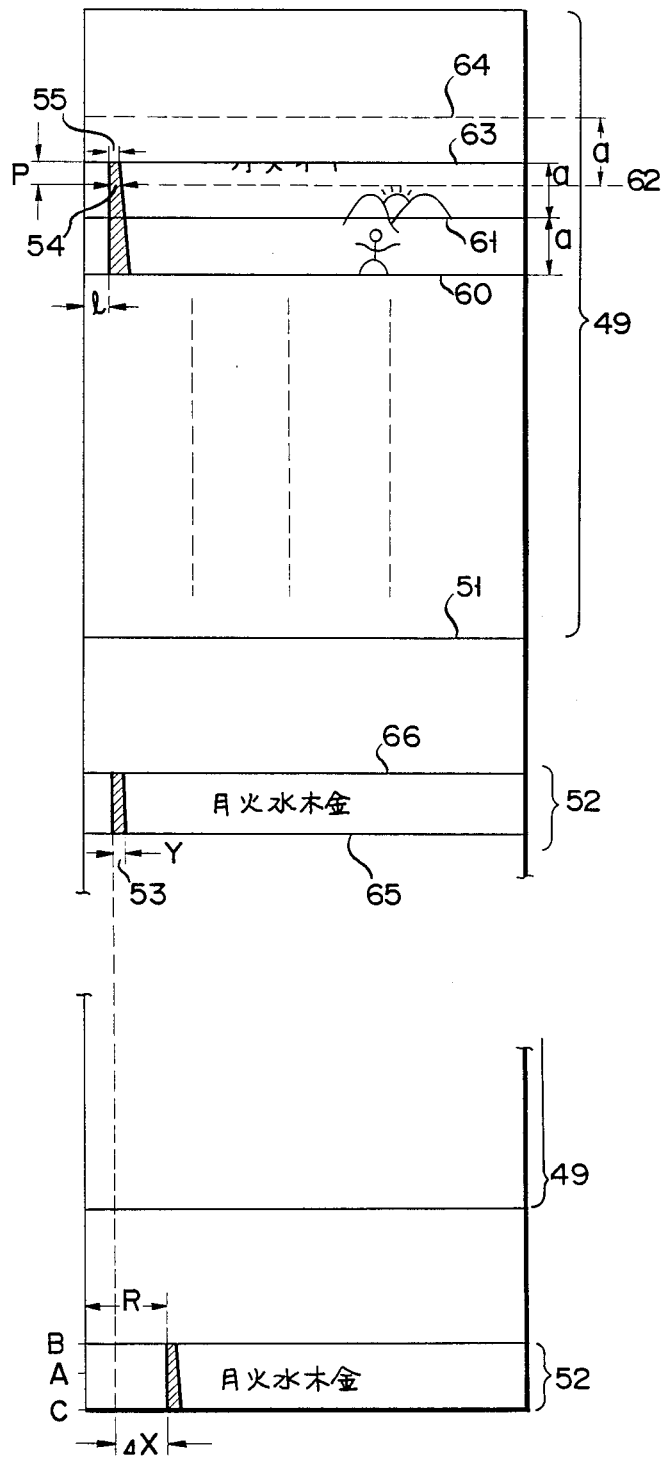
FIG. 6 illustrates how the hand scanner of the system shown in FIG. 4 scans a document sheet having an image and inputs data from this image.

FIG. 6 shows a storage state of the memory 49. In this embodiment, scanner 27 scans document sheet 21 from bottom to top. Hence, the operator first aligns ruler 25 with the lower end 51 of document sheet 21 for the first row-area scanning, and moves hand scanner 27 from the left side of sheet 21 to the right side. Scanner 27 generates strobe pulses and image data which are fed through signal line 30 to hand scanner interface adapter logic 41. The image data is then stored in a temporary memory area 52. After the image data stored in the temporary memory area 52 is processed as described below, the image data in the area 52 are sent to the first area of the image input memory 49. Then, the operator slides ruler 25 upward, aligning it with the lowest guide line 24, and moves hand scanner 27 from the left side of sheet 21 to the right side, thus performing the second row-area scanning. As a result, the image data obtained by this scanning is stored in the temporary memory area 52 and sent to the second area of the image input memory 49.

The operator carries out further row-area scannings, aligning ruler 25 with all other guide lines 24 and repeatedly move scanner 27 along lines 24, thus reading all of the image data from sheet 21 and supplying it to memory 49. In FIG. 6, lines 60, 61 and 63 are horizontal boundary lines defining address areas corresponding to the row-area scanning regions of sheet 21. Horizontal, parallel lines 62 and 64 define a memory area into which the image data will be transferred from temporary memory area 52. The width Y of that portion of mark 23 which is stored in the temporary memory area 52 is identical with the width of that portion of black mark 23 which is stored in the memory area defined by lines 62 and 64. For example, the width 53 is identical with the width 54.

Figure 7A:
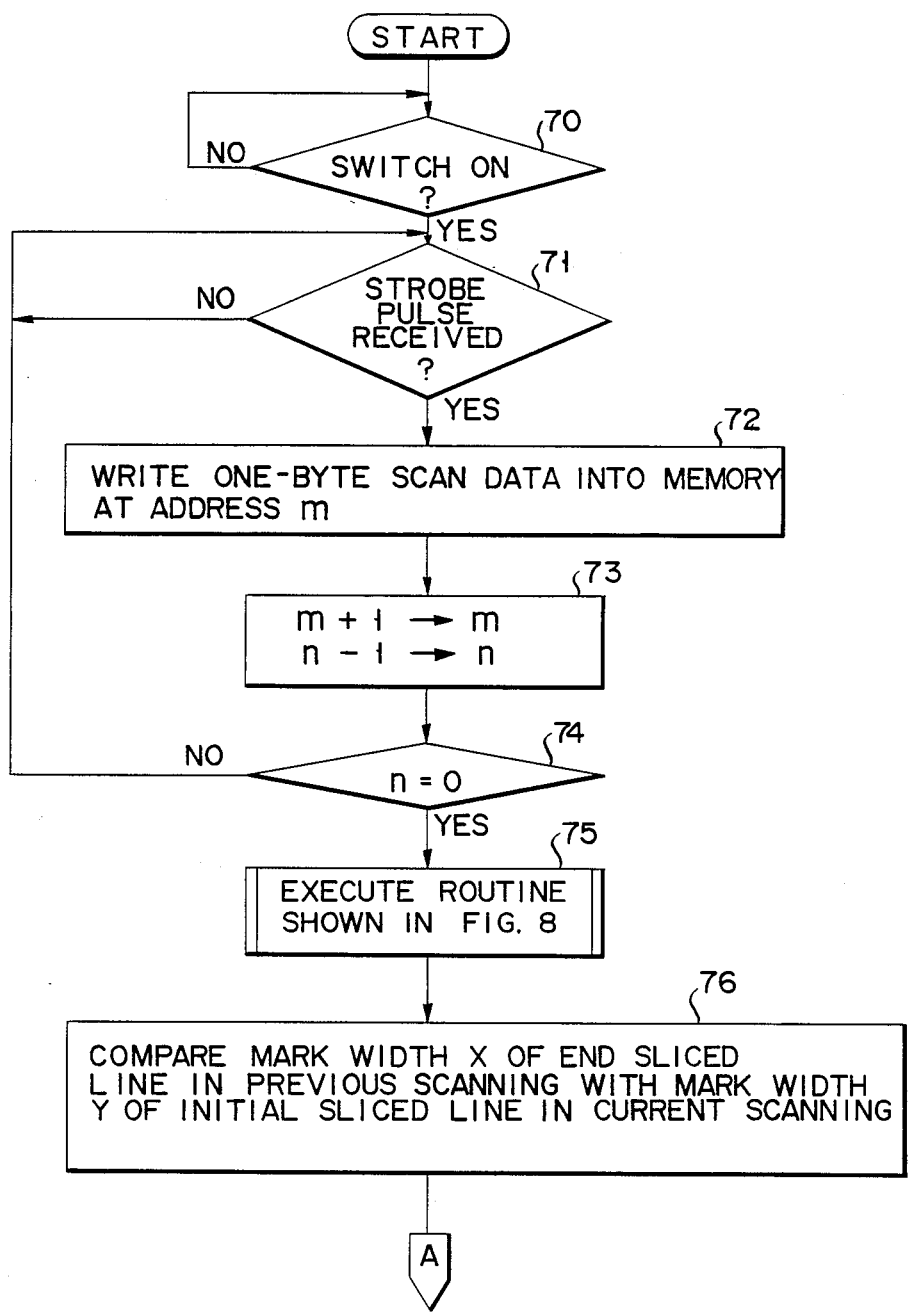
FIGS. 7A, 7B and 8 are flow charts explaining the input processing performed in the system of FIG. 4.
Figure 7B:
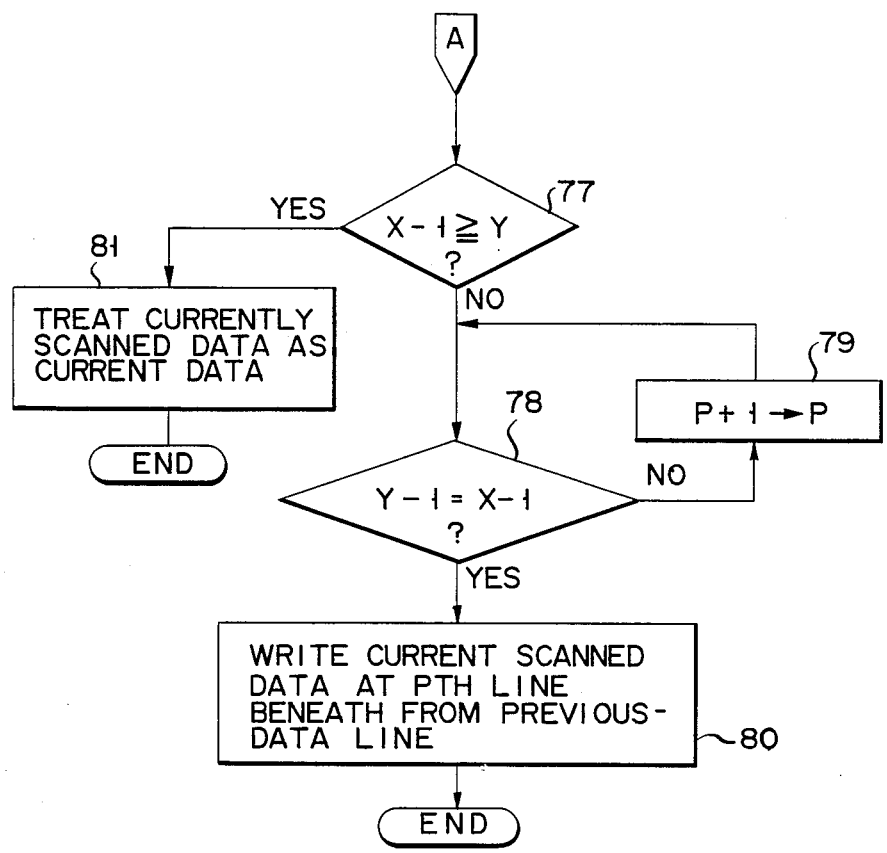
Figure 8:
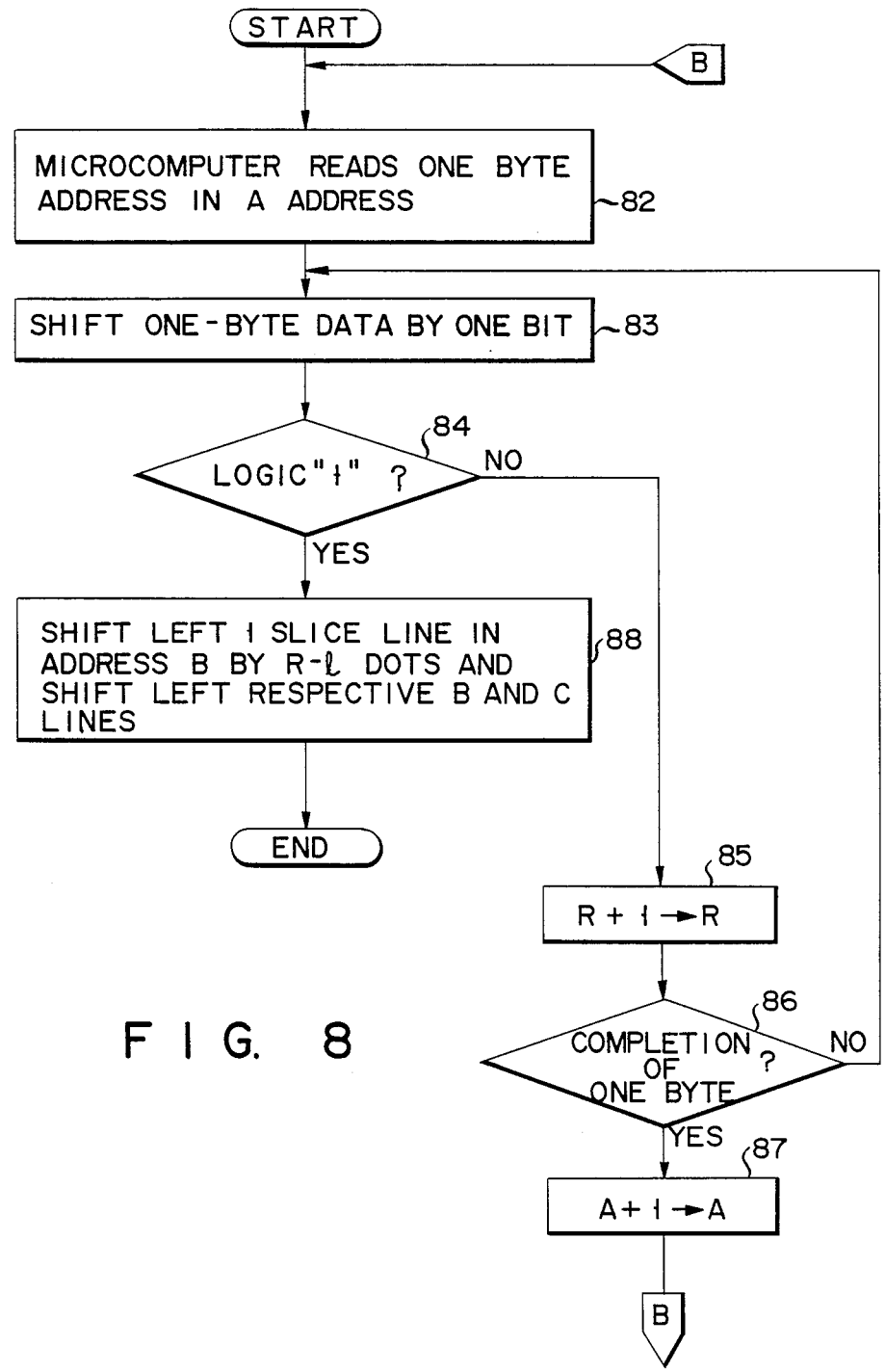

FIGS. 7A and 7B are flow charts explaining the detection and comparison of the widths of portions of black mark 23. FIG. 8 is a flow chart explaining how to align pieces of data obtained by the row-area scannings, in accordance with the data provided by the detection of the widths of the portions of mark 23.

It will be explained how the system described above operates to read and input the image data from a document sheet 21 of A4 size which is 197 mm long, when strobe pulse-generating slits 26 are arranged at intervals of 1 mm. In this case, hand scanner 27 generates one strobe pulse and 1 byte image data every time it is moved 1 mm along ruler 25.

First, the operator aligns ruler 25 with any guide line 24 printed on tablet 22. The operator then turns on the switch 29 of hand scanner 23. Scanner 27 supplies a scanning start signal to microcomputer 42 through line 30 and adaptor logic 41. The operator moves scanner 27 from a position to the left of black mark 23 to the right side of sheet 21, thus carrying out a row-area scanning. (The scanning start position must be to the left of mark 23.) The strobe pulses and image data read by this scanning are supplied to microcomputer 42. The image data is stored in the temporary memory area 52, byte by byte, by repeating the data processing routine consisting of steps 70–74 shown in FIG. 7A.

In this routine, decision is made, in step 70, as to whether or not switch 29 is on. If yes, the control advances to step 71. If not, step 70 is repeated. Since switch 29 has been turned on, step 71 is executed, determining whether or not a strobe pulse has been input. If yes, the control goes to the next step 72. If not, step 71 is repeated. Since strobe pulses have been input, the first byte of the image data obtained by said slice-scanning is stored at the first address of temporary memory area 52. (In FIG. 7A, m denotes the address of area 52 and its initial value represents the first address, and n denotes the maximum number of bytes that can be obtained by one row-area scanning.) In step 73, every time a byte is input m is incremented by one and n is decremented by one. In the next step, 74, decision is made as to whether or not n=0. If yes, the control goes to step 75. If not, steps 71–73 are repeated until n is reduced to zero, thereby storing the whole image data obtained by the row-area scanning in temporary memory area 52.

As shown in FIG. 6, the data representing the portions of black mark 23 is stored at the addresses of memory 49, which are schematically defined by lines 60, 61 and 63.

When "n=0" is detected in step 74, the data processing routine shown in FIG. 8 is carried out to align the left side of mark 23 stored in temporary memory area 52 with the left side of the mark stored in the addresses of memory 49. First, in step 82, microcomputer 42 reads the first byte from the subaddress A of area 52. In step 83, this byte is shifted to the left, bit by bit. In the next step 84, decision is made as to whether or not a logical "1" bit has been read to microcomputer 42. If yes, the control advances to step 88. If not, it goes to step 85. In step 85, one bit is taken from the bits, the number of which corresponds to the distance R between the scanning start position and the left side of mark 23 printed on tablet 22. In the next step 86, it is judged whether or not one byte has been shifted to the left. If yes, the control goes to step 87. If not, it returns to step 83. In step 83, the second byte stored in the subaddress A is designated, and the control returns to step 82. Steps 82–87 are repeated until a logical "1" bit is detected, thereby detecting the left side of mark 23 stored in area 52. The control, therefore, advances to step 88. In this step, the bits, the number of which corresponds to the value (R−l) and which stored in subaddresses B and C of area 52, are shifted to the left. (The symbol "l" is the distance between the left side of mark 23 stored in the addresses of memory 49 and the left side of mark 23 stored in these subaddresses.

When l is greater than R, it suffices to shift the bits, the number o which corresponds to (l−R), to the right. Any value can be used for "lpe H 48603658.002."

The image data obtained by the row-area scanning and stored in area 52 is thus changed to the form shown in the upper half of FIG. 6.

Subaddresses A, B and C of temporary memory area 52 have a length of 197 bytes plus several bytes. (The number of these additional bytes corresponds to the longest possible distance between the scanning start position and the left side of sheet 21.)

The pieces of image data obtained by repeating slice-scanning are not stored in the consecutive addresses of memory 49. They are stored in those addresses designated by hand scanner interface adapter logic 41 or microcomputer 42. More specifically, the image data is transferred from temporary image area 52 to the address of memory 49, designated by the following data processing routine.

When step 75 is carried out, the control goes to step 76, shown in FIG 7A. In this step, X is compared with width Y of the mark stored in area 52. Here, X represents the width of mark 23 included in the image data obtained by the immediately preceding slice-scanning and stored in the area defined by lines 61 and 63 (FIG. 6). The control goes to step 77 (FIG. 7B). In step 77, decision is made as to whether or not (X−1) is equal to or greater than Y. (The term "−1" in (X"1) represents a width difference of one dot.) When (X−1) is greater than Y, this means that there is a space between the two scanned regions. When (X−1) is equal to Y, this means that these regions are neither overlapping nor spaced apart. If yes in step 77, the control goes to step 81, and if no, it advances to step 78.

In the case shown in FIG. 6, line 63 extends horizontally, separating the row of characters into upper and lower portions. That is, the image data obtained by scanning the region below line 31 shown in FIG. 4 is stored in the area defined by line 61 and 63 (FIG. 6). When the region of sheet 21, which is defined by lines 32 and 33, is scanned, those portions of the characters which are located above line 31 will be input. Since (X−1) is less than width Y, the control advances to step 78. In this step, it is judged whether or not (Y−1) is equal to (X−1). If yes, the control goes to step 80. If not, step 79 will be executed. Since (Y−1) is greater than (X−1), step 79 is executed. In step 79, the distance P between lines 62 and 63 (FIG. 6) is incremented. Steps 78 and 79 are repeated until (Y−1) becomes equal to (X−1).

When it is detected in step 78 that (Y−1) equals (X−1), the control goes to step 80. In step 80, the image data is transferred from temporary memory area 52 to the memory area defined by lines 62 and 64, and the data, which has been stored in the area defined by lines 62 and 63, is simultaneously erased.

Figure 9:
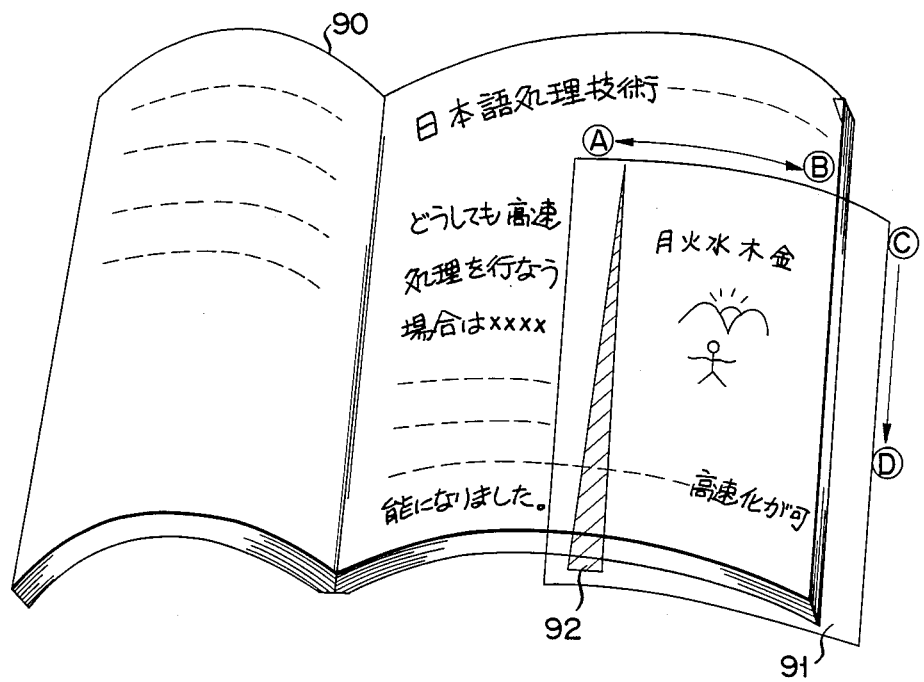
FIGS. 9 and 10 are a perspective view and a plan view, respectively, explaining the means used in the system of FIG. 4 to attach a mark to a document sheet.
Figure 10:
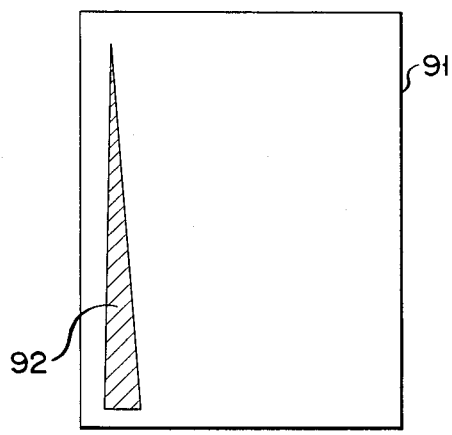
Figure 11:
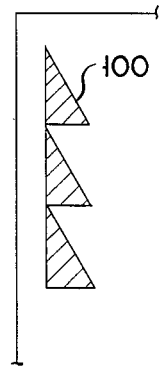
FIG. 11 is a plan view of a modification of the mark.

FIGS. 9–11 show another embodiment of the present invention. As shown in FIG. 9, a transparent sheet 91 with a black mark 92 printed on it is used to read and input the data of an entire page of a book, or the data of part of the page. To read and input the data printed on a portion defined by rectangle ABCD, the operator places sheet 91 on the page, covering said portion ABCD. The operator, then manipulates hand scanner 27 to thus perform the slice-scanning in the same way as in the first embodiment. The strobe pulses and pieces of image data obtained by the repeated slice-scannings are input to a hand scanner controller. The pieces of image data are processed in the same manner as in the first embodiment and then stored in the addresses of an image input memory.

FIG. 11 shows a modification 100 of the black mark. This mark 100 is saw-tooth shaped, consisting of right-angled triangles. The data representing these triangles is stored at the addresses of an image input memory as in the first embodiment. The number of dots corresponding to the width of mark 100 changes much more according to the slice lines than in the first and second embodiments. Hence, the saw-tooth shaped mark helps to enhance the precision of input data.

In the above embodiment, the present invention has been applied to a hand scanner input system. However, the present invention is not limited to the above embodiment. For example, the present invention can also be applied to a mechanical scanner having poor mobility and equally poor accuracy, to thereby obtain the same advantage as that of the above embodiment.

What is claimed is:

1. A scanner input system, comprising:
   a mark having first and second edges which are not parallel, said mark being continuous;
   scanning means for repetitively slice-scanning a document sheet and said mark in a direction perpendicular to said first edge;
   storing means for storing a plurality of data corresponding to the slice-scanned portions of said mark which are repetitively scanned by said scanning means; and
   data manipulating means for manipulating the data in said storing means to align a slice-scanned portion of said mark to a prior slice-scanned portion of said mark such that said first and second edges do not overlap each other.

2. A scanner input system according to claim 1, wherein said data manipulating means shifts the data corresponding to the slice-scanned portion of said mark and the data corresponds to the slice-scanned portion of the document sheet in the scanning direction so that the first edge of the slice-scanned portion of said mark is coincident with the first edge of a prior slice-scanned portion of said mark to thereby correct start positions for every slice-scanning, and shifts that data corresponding to slice-scanned portion of the mark and data corresponding to the slice-scanned portion of the document sheet in a direction perpendicular to the scanning direction so that the width of the slice-scanned portion of a mark is equal to the width of a prior slice-scanned portion of a mark.

3. A scanner input system according to claim 1 which further includes ruler means for guiding said scanning means.

4. A scanner input system according to claim 1, wherein said second edge is not parallel to said first edge.

5. A scanner input system according to claim 1, wherein said second edge is saw-tooth shaped, said mark being a plurality of triangles extending along said first edge.

6. A scanner input system according to claim 1, which further includes:
   a tablet having said mark and document sheet disposed thereon;
   said scanner having a sensor; and
   parallel guidelines printed on said tablet at intervals equal to the width of the scanning face of the sensor.

7. A scanner input system according to claim 1, wherein said mark is printed on the document sheet.

8. A scanner input system, comprising:
   a mark disposed on a transparent sheet, said mark having first and second edges which are not parallel, said mark being continuous;
   scanning means for repetitively slice-scanning a document sheet and said mark in a direction perpendicular to said first edge;

storing means for storing a plurality of data corresponding to the splice-scanned portions of said mark which are repetitively scanned by said scanning means; and data manipulating means for manipulating the data in said storing means to align a slice-scanned portion of said mark to a prior slice-scanned portion of said mark such that said first and second edges do not overlap each other.

9. A transparent sheet according to claim 8, wherein said second edge is not parallel to said first edge.

10. A transparent sheet according to claim 8, wherein said regular second edge is saw-tooth shaped, said mark being a plurality of triangles extending along said first edge.

* * * * *